United States Patent
Mulhauser et al.

(10) Patent No.: US 6,473,988 B1
(45) Date of Patent: Nov. 5, 2002

(54) AUXILIARY CONTAINER FOR SALAD SPINNER

(75) Inventors: Paul Mulhauser, New York, NY (US); Tucker Fort, New York, NY (US)

(73) Assignee: WKI Holding Company, Inc., Elmira, NY (US)

( * ) Notice: Subject to any disclaimer, the term of this patent is extended or adjusted under 35 U.S.C. 154(b) by 0 days.

(21) Appl. No.: 09/932,649

(22) Filed: Aug. 17, 2001

(51) Int. Cl.[7] ............................................. F26B 11/02
(52) U.S. Cl. .............................. 34/58; 34/127; 34/128; 34/317; 34/318; 34/322
(58) Field of Search ........................... 34/312, 313, 317, 34/318, 319, 322, 498, 499, 58, 108, 127, 128; 99/479, 485, 495, 511, 512; 210/360.1, 380.1, 784, 781; 494/46, 60, 62; 426/478; D7/368, 665

(56) References Cited

U.S. PATENT DOCUMENTS

| | | | | |
|---|---|---|---|---|
| 417,799 A | * | 12/1889 | Waldbaur | 34/58 |
| 2,556,153 A | * | 6/1951 | Collins | 68/20 |
| 2,700,473 A | * | 1/1955 | Emmert et al. | 210/76 |
| 3,277,583 A | * | 10/1966 | Mack | 34/58 |
| 3,753,297 A | | 8/1973 | Mantelet | |
| 4,090,310 A | | 5/1978 | Koff | |
| 4,114,286 A | | 9/1978 | Bingham | |
| 4,209,916 A | | 7/1980 | Doyel | |
| 4,321,756 A | | 3/1982 | Mosely | |
| 4,383,379 A | * | 5/1983 | Avril | 34/128 |
| 4,587,745 A | | 5/1986 | Tanner | |
| 4,702,162 A | | 10/1987 | Sontheimer et al. | |
| 4,756,169 A | * | 7/1988 | Pignal et al. | 68/23 R |
| 5,054,209 A | | 10/1991 | Koff | |
| 5,261,168 A | | 11/1993 | Li | |
| 5,317,964 A | * | 6/1994 | Prudhomme | 99/495 |
| 5,966,830 A | | 10/1999 | Schnacke | |
| 5,992,309 A | * | 11/1999 | Mulhauser et al. | 99/495 |
| D419,834 S | | 1/2000 | Lai | |

* cited by examiner

Primary Examiner—Ira S. Lazarus
Assistant Examiner—K. B. Rinehart
(74) Attorney, Agent, or Firm—Seyfarth Shaw

(57) ABSTRACT

A food drying device of the type which includes an outer housing, a perforated main container in the housing and a drive apparatus on the housing for rotating the main container relative to the housing, includes a perforated auxiliary container disposable in the main container, and including an open-top bowl-shaped base and a removable lid. The bottom of the base has plural radial grooves which mate with radial ribs on the bottom of the main container so that they rotate together without slippage. A central hub on the main container lid is receivable in a central recess on the auxiliary container lid to limit relative axial movement.

22 Claims, 4 Drawing Sheets

US 6,473,988 B1

AUXILIARY CONTAINER FOR SALAD SPINNER

BACKGROUND

This application relates to devices for drying wet foods, such as salad ingredients. The application describes an improvement of the food drying device disclosed in U.S. Pat. No. 5,992,309.

U.S. Pat. No. 5,992,309 discloses a centrifugal food drying device of the type generally known as salad spinners. It has an outer housing including a bowl and an associated cover and a perforated container in the nature of a basket disposable in the bowl coaxially therewith and having a removable lid. The bowl cover and the basket lid are coupled together by a manually operable drive mechanism which rotates the basket lid relative to the bowl cover. When the cover and lid are respectively in place on the bowl and basket, the parts are coupled so that the basket and lid rotate together relative to the bowl and cover, so that centrifugal force causes the moisture on the contents of the basket to be ejected through the perforations in the basket into the bowl.

That salad spinner works well for drying foods such as salad ingredients, leafy vegetables and the like. However, the basket has a relatively large volume, and the lattice-work structure of the basket defines relatively large openings between the lattice webs. This can be inconvenient for drying small quantities of foods and for drying certain types of foods, such as certain berries, which may be very small or very fragile. Small berries may be thrown out through the openings in the basket, could become wedged in the openings, or could become bruised or crushed from moving over the basket lattice webs, as on a washboard or from being pressed against the basket, by centrifugal force. Furthermore, in general, small quantities of foods may undergo considerable movement relative to the basket which could be damaging to the food.

SUMMARY

This application describes an apparatus which avoids the disadvantages of prior devices while affording additional structural and operating advantages.

A general aspect is the provision of an auxiliary container which is uniquely constructed for cooperation with a rotatable food drying device, such as a salad spinner.

Another aspect is the provision of a rotatable food drying device and an auxiliary container therefor which are cooperable in combination for drying small quantities of foods and/or fragile foods and foods comprised of relatively small units.

Another aspect is the provision of an auxiliary container of the type set forth which is usable with pre-existing rotatable food drying devices.

Certain ones of these aspects may be attained by providing a container comprising: a wall structure defining a closed food-containing cavity and having apertures formed therein and communicating with the cavity; the wall structure having a section movable between open and closed conditions to define a closeable access port into the cavity; the wall structure having a plurality of recesses formed in an outer surface thereof.

Other aspects may be attained in a food drying device including an outer housing, a perforated main container in the housing and a drive apparatus on the housing for rotating the main container relative to the housing, the improvement comprising: a perforated auxiliary container disposable in the main container and having a closeable access port; and first and second engagement structures respectively on the main container and the auxiliary container for engagement with each other to effect rotation of the auxiliary container with the main container.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
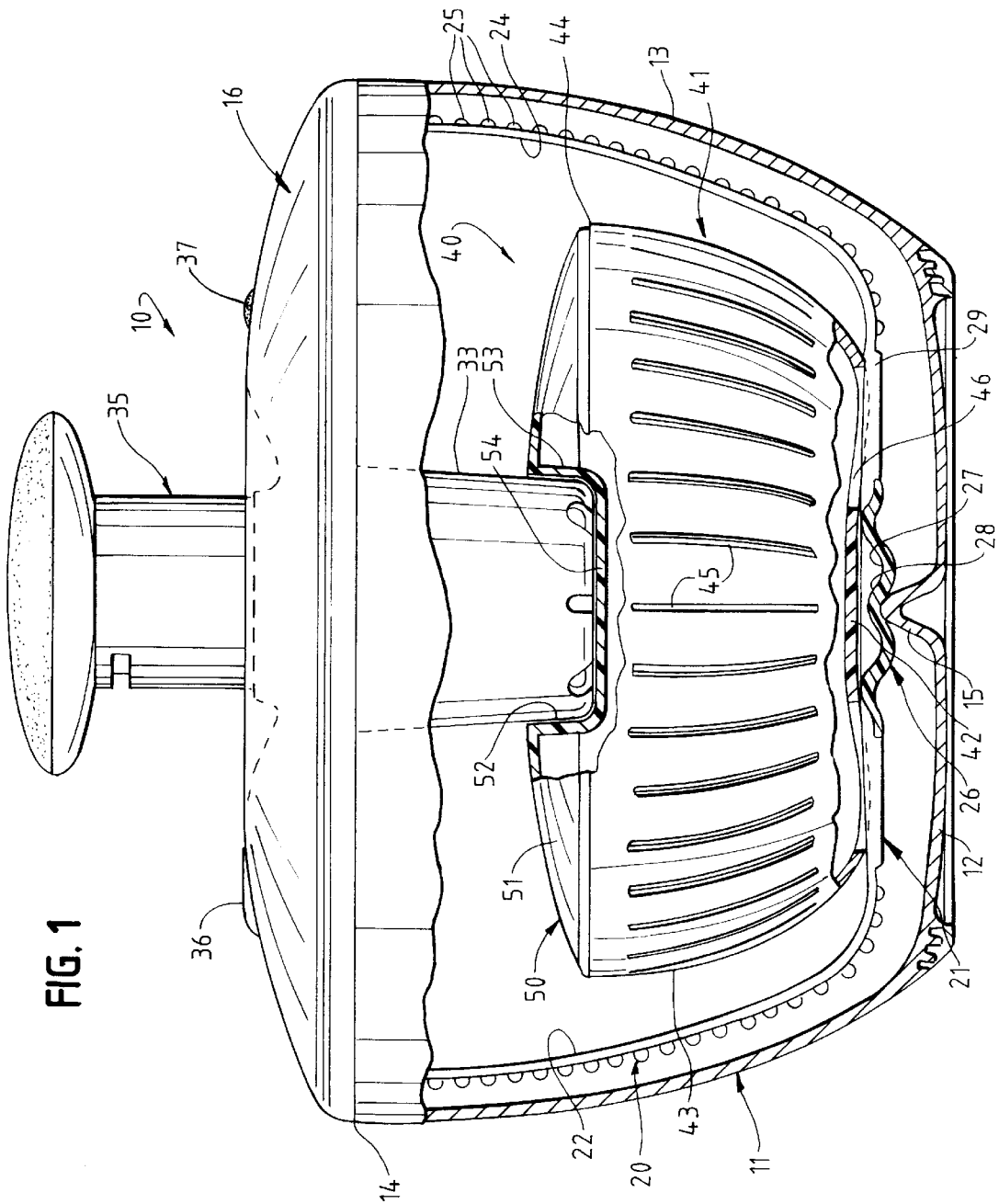
FIG. 1 is a side elevational view, in partial section, of a salad spinner incorporating an auxiliary container.
Figure 5:
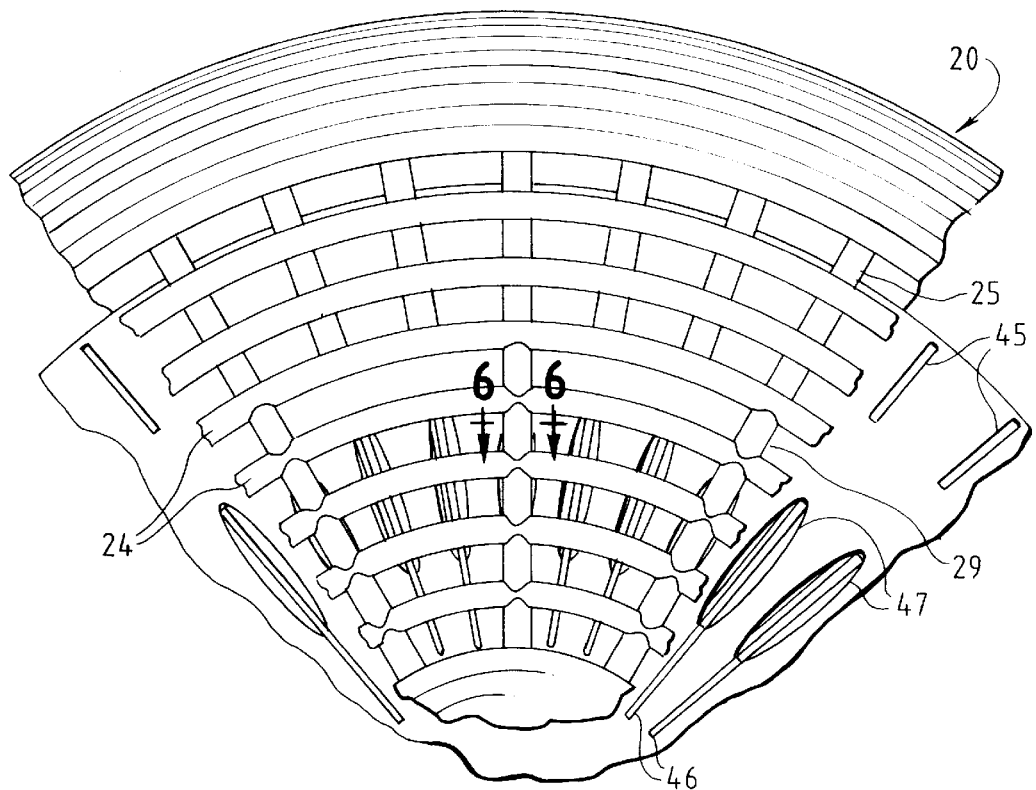
FIG. 5 is an enlarged, fragmentary, bottom plan view of the salad spinner of FIG. 1.

Referring to FIGS. 1 and 5, there is illustrated a food drying device in the nature of a salad spinner generally designated by the numeral 10, which is substantially of the type disclosed in the aforementioned U.S. Pat No. 5,992, 309, the disclosure of which is incorporated herein by references. Accordingly, only so much of the construction of the salad spinner 10 will be described herein as is necessary for an understanding of the subject matter sought to be protected in this application.

The salad spinner 10 has a housing which includes a bowl 11 with a generally flattened circular bottom 12 and an upstanding side wall 13 terminating in a rim 14 which defines an upper open end of the bowl. A generally conical pivot projection 15 projects upwardly from the bottom wall 12 centrally thereof. The housing also includes a circular cover 16 for closing the open upper end of the bowl 11, the cover 16 having a cylindrical lip (not shown) disposable in internal overlapping relationship with the bowl rim 14.

The salad spinner 10 also includes a generally bowl-shaped, perforated basket 20 having a generally flattened circular bottom 21 and an upstanding side 22 terminating at the upper end in a circular rim. The basket is formed of a plurality of longitudinally spaced circumferential ribs 24 interconnected with a plurality of circumferentially spaced longitudinal ribs 25 to form a mesh or lattice-work structure. The bottom 21 includes a solid circular central disk 26 having an annular recess 27 therein surrounding an upstanding, generally conical central pivot projection 28, which defines on its underside a recess for receiving the pivot projection 15 of the bowl 11 to form a bearing for rotation of the basket 20 relative to the bowl 11. Most of the longitudinal ribs 25 terminate well short of the central disk 26, but equiangularly spaced ribs 29 of the ribs 25 extend into the central disk 26, as can best be seen in FIG. 5.

The basket 20 forms a main container for receiving food to be dried and is provided with a removable circular lid (not shown) having a circumferential cylindrical lip disposable in overlapping relationship with the rim of the basket 20. Projecting from the lip are circumferentially spaced beads (not shown) which are disposed for engagement with certain ones of the circumferential ribs 24 for transmission of driving rotational force from the lid to the basket 20. The lid has a depending generally cylindrical central hub 33.

The lid is coupled to the bowl cover 16 by a manually operable drive assembly 35 which includes a conversion mechanism for transmitting axially reciprocating movement of a plunger to rotational movement of the lid relative to the cover 16. The cover 16 carries a radial movable latch 36 engageable with the drive assembly 35 for latching the plunger in a downward or retracted position, and also carries a manually depressible brake 37 for frictional engagement with the lid to brake rotation thereof.

Figure 2:
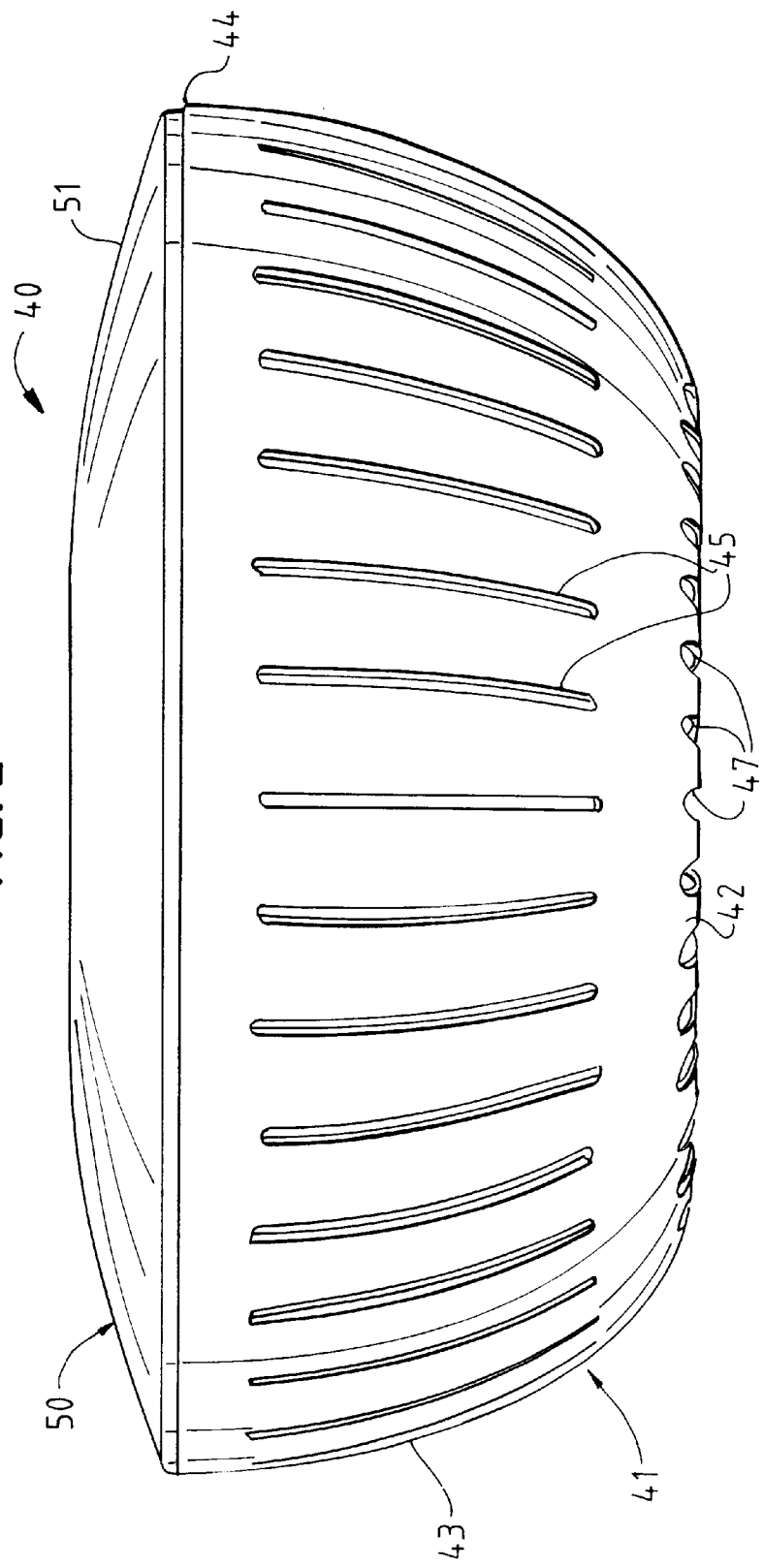
FIG. 2 is a side elevational view of the auxiliary container of FIG. 1.
Figure 3:
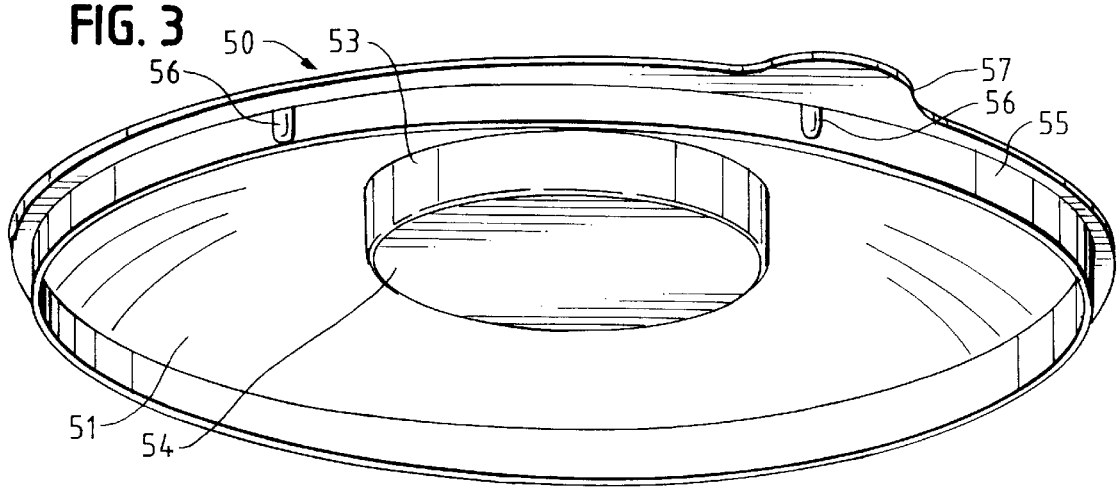
FIG. 3 is a bottom perspective view of the lid of the auxiliary container of FIG. 2.
Figure 4:
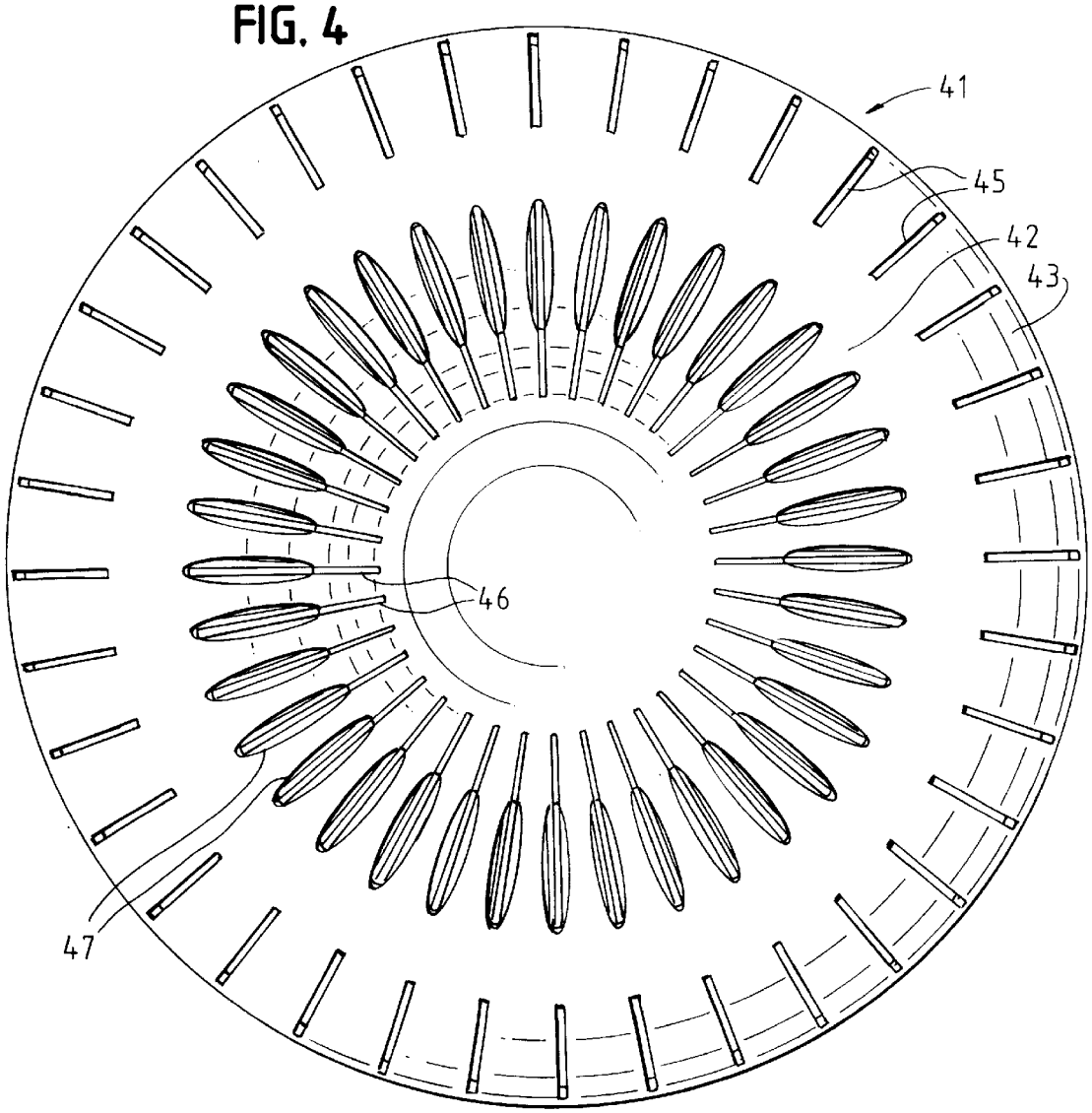
FIG. 4 is a bottom plan view of the auxiliary container of FIG. 2.

Referring now also to FIGS. 2–4, there is also provided an auxiliary container 40, which includes a generally bowl-shaped, open-top base 41 having a circular bottom wall 43 and an upstanding side wall 42 terminating in a rim 44. Formed in the side wall 43 are a plurality of circumferentially spaced and longitudinally extending narrow slots or apertures 45. Formed in the bottom wall 42 are a plurality of circumferentially spaced and generally radially extending narrow slits or apertures 46, the outer ends of which have tapered or beveled edges defining radially elongated shallow recesses 47.

The auxiliary container 40 also has a removable lid 50 including a circular top wall 51 having formed centrally thereof a large circular recess 52 having a cylindrical side wall 53 and a bottom wall 54. Depending from the top wall 51 around the its periphery is a cylindrical flange 55 having a plurality of circumferentially spaced ribs 56 projecting radially outwardly therefrom. A tab 57 projects radially outwardly from the top wall 51. The lid 50 is dimensioned to close the upper end of the container base 41, with the cylindrical flange 55 fitting down inside the base side wall rim 44, the ribs 56 providing for a snug frictional fit. The tab 57 facilitates removal of the lid 50 from the base 41.

Figure 6:
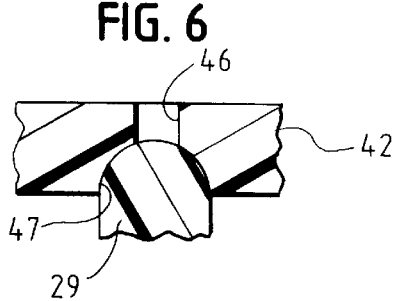
FIG. 6 is a further enlarged, fragmentary sectional view taken generally along the line 6—6 in FIG. 5.

It can be seen that the auxiliary container 40 is substantially smaller than the basket 20 and is dimensioned to fit freely therewithin and to rest upon the basket bottom 21. The recesses 47 in the base 41 of the auxiliary container 40 are dimensioned and positioned so that certain ones of them will mateably receive the engagement ribs 29 of the basket 20, as can best be seen in FIGS. 5 and 6. Thus, the ribs 29 and the recesses 47 respectively form first and second engagement structures which transmit the rotational movement of the basket 20 to the auxiliary container 40 so that they rotate together.

After the auxiliary container 40 is placed in the basket 20, the basket lid and cover 16 are mounted in place. It can be seen from FIG. 1 that the auxiliary container 40 is so dimensioned that the lower end of the hub 33 is received in the central recess 53 of the auxiliary container lid 50. Thus the hub 33 and the recess 52 respectively form first and second retaining structures which cooperate to inhibit vertical or axial movement of the auxiliary container 40 relative to the basket 20, preventing accidental disengagement of the ribs 29 from the recesses 47.

It will be appreciated that, as the auxiliary container 40 rotates with the basket 20, centrifugal force causes the moisture on the contents of the auxiliary container 40 to be ejected through the apertures 45 and 46 and ultimately into the bowl 11. It can be seen that the apertures 45 and 46 are significantly narrower than the openings or spaces between the lattice-work ribs of the basket 20, so that food items such as berries and the like cannot pass therethrough and cannot be wedged therein. Thus the inner surface of the auxiliary container base 41 is substantially smooth and will do minimal damage to fragile foods. The diameter of the auxiliary container 40 is substantially less than that of the basket 20, so that centrifugal forces exerted on the contents of the auxiliary container will be proportionately smaller. Furthermore, it will be appreciated that small quantities of foods can be dried in the auxiliary container 40 with minimal relative movement between the foods and the container.

Also, it will be understood that the auxiliary container 40 could be used independently of the salad spinner 10 and serve as a colander or the like for draining wet foods or, simply, as a storage container.

The auxiliary container 40 is molded of suitable plastic materials, but it will be appreciated that other materials could be used. Also, it will be appreciated that, if desired, the engagement structures could be formed on the side walls of the auxiliary container base 41 and the basket 20 but forming them on the bottom walls permits the auxiliary container 40 to have a diameter substantially less than that of the basket 20.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An auxiliary container removably receivable in a rotatable main container of a food drying device, the auxiliary container comprising:

a wall structure defining a closed food-containing cavity and having apertures formed therein and communicating with the cavity;

the wall structure having a section movable between open and closed conditions to define a closeable access port into the cavity; and control structure on the wall structure adapted for interface with an associated rotatable main container of a food drying device.

2. The container of claim 1, wherein the wall structure has top and bottom and side portions.

3. The container of claim 2, wherein the top portion includes the movable section.

4. The container of claim 2, wherein the apertures are formed in the bottom and side portions.

5. The container of claim 2, wherein the control structure includes structure on the bottom portion.

6. The container of claim 5, wherein the control structure includes structure on the top portion.

7. The container of claim 1, wherein the wall structure includes an open-top base, the movable section including a lid removably mountable on the base for closing the open top thereof.

8. The container of claim 2, wherein coated structure includes recesses formed in the bottom portion.

9. The container of claim 2, wherein coated structure includes a large recess formed centrally of the top portion.

10. In a food drying device including an outer housing, a perforated main container in the housing and a drive apparatus on the housing for rotating the main container relative to the housing, the improvement comprising:

a perforated auxiliary container disposable in the main container and having a closeable access port;

first and second engagement structures respectively on the main container and the auxiliary container for engagement with each other to effect rotation of the auxiliary container with the main container, the main container and the auxiliary container having a common axis of rotation, and first and second retaining structures respectively on the main container and the auxiliary container for cooperation to limit relative axial movement thereof.

11. The device of claim 10, wherein the main container and the auxiliary container respectively have first and second bottom portions, the first and second engagement structures being respectively formed on the first and second bottom portions.

12. The device of claim 10, wherein one of the first and second engagement structures includes a plurality of ribs and the other of the first and second engagement structures includes a plurality of recesses.

13. The device of claim 12, wherein the first engagement structures are the ribs and the second engagement structures are the recesses.

14. The device of claim 10, wherein one of the first and second retaining structures is a projection and the other of the first and second retaining structures is a recess.

15. The device of claim 14, wherein the first retaining structure is the projection and the second retaining structure is the recess.

16. The device of claim 10, wherein each of the main container and the auxiliary container has a top portion, the first and second retaining structures being respectively formed on the top portions.

17. In a food drying device including an outer housing, a perforated main container in the housing and a drive apparatus on the housing for rotating the main container relative to the housing, the improvement comprising:

a perforated auxiliary container disposable in the main container, the auxiliary container including an open-top base having side and bottom portions and a lid removably mountable on the base for closing the open top of the base;

first hand second engagement structures respectively on the main container and the auxiliary container for engagement with each other to effect rotation of the auxiliary container with the main container, the main container and the auxiliary container having a common axis of rotation, and first and second retaining structures respectively on the main container and the auxiliary container for cooperation to limit relative axial movement thereof.

18. The device of claim 17, wherein the base is perforated.

19. The device of claim 17, wherein one of the first and second engagement structures includes a plurality of ribs and the other of the first and second engagement structures includes a plurality of recesses.

20. The device of claim 19, wherein the main container includes a bottom portion, the first engagement structure including ribs formed on the bottom portion, the second engagement.

21. The device of claim, 17, wherein the main container has a top portion, the first and second retaining structures being respectively formed on the top portion and the lid. structure including recesses formed on the base of the auxiliary container.

22. The device of claim 21, wherein the first retaining structure is a projection and the second retaining structure is a large recess receiving the projection.

* * * * *

UNITED STATES PATENT AND TRADEMARK OFFICE
CERTIFICATE OF CORRECTION

PATENT NO.  : 6,473,988 B1
DATED  : November 5, 2002
INVENTOR(S)  : Paul Mulhause et al.

It is certified that error appears in the above-identified patent and that said Letters Patent is hereby corrected as shown below:

<u>Column 6,</u>
Line 27, after "engagement", insert -- structure including recesses formed on the base of the auxiliary container --;
Lines 32-33, delete "structure including recesses formed on the base of the auxiliary container.".

Signed and Sealed this

Fifth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,473,988 B1
DATED          : November 5, 2002
INVENTOR(S)    : Paul Mulhause et al.

It is certified that error appears in the above-identified patent and that said Letters Patent is hereby corrected as shown below:

<u>Title page,</u>
Item [56], References Cited, U.S. PATENT DOCUMENTS, add
-- 3,716,164 A        2/1973        Fennema --.

Signed and Sealed this

Fourth Day of November, 2003

JAMES E. ROGAN
*Director of the United States Patent and Trademark Office*